May 23, 1939.  W. F. WESTENDORP  2,159,827

ELECTRIC VALVE CONVERTING SYSTEM

Filed July 31, 1937

Inventor:
Willem F. Westendorp,
by Harry E. Dunham
His Attorney.

Patented May 23, 1939

2,159,827

UNITED STATES PATENT OFFICE 2,159,827

ELECTRIC VALVE CONVERTING SYSTEM

Willem F. Westendorp, Schenectady, N. Y., assignor to General Electric Company, a corporation of New York Application July 31, 1937, Serial No. 156,735

12 Claims. (Cl. 175—363)

My invention relates to electric valve converting systems and more particularly to those systems suitable for transferring energy between direct and alternating current circuits.

It is an object of my invention to provide an improved electric valve converting system for transferring energy between a constant current direct current circuit and a constant potential alternating current circuit and which will be simple and reliable in operation.

It is a further object of my invention to provide an improved control circuit for the control electrodes of a plurality of electric valves.

It is a still further object of my invention to provide an improved control circuit for the control electrodes of the valves in a converting system for transferring energy between constant current direct current circuits and a constant potential alternating current circuit.

In accordance with my invention in its simplest form, I utilize a pair of high frequency oscillatory circuits, each including an electric discharge valve, which are arranged to receive energy from the direct current circuit. A low frequency circuit interconnects the alternating current circuit with said high frequency oscillatory circuits. The valves in the oscillatory circuits are arranged to become conductive simultaneously when there is no load appearing across the alternating current circuit. In order to supply energy to the alternating current circuit the moments of ignition of the valves in the oscillatory circuits are periodically and alternately retarded so that power components appear in the low frequency circuit. In order to hold the voltage appearing across the alternating current circuit within certain predetermined limits means may be arranged which operate to control the degree of periodic and alternate retardation of the moments of ignition of the valves of the oscillatory circuit.

Figure 1:
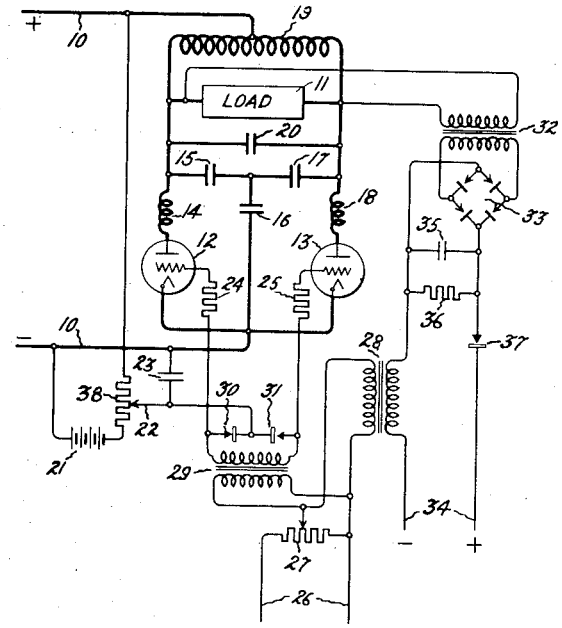
Figure 2:
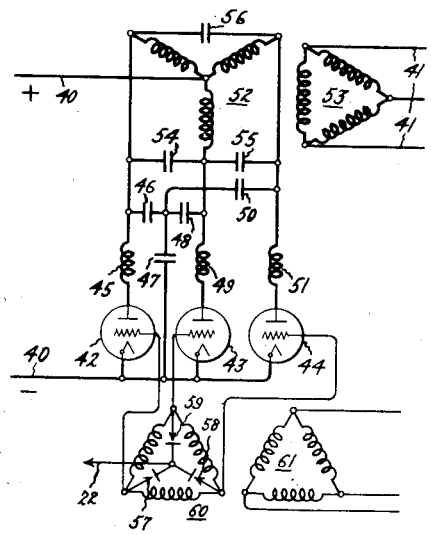
Figure 3:
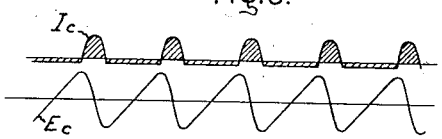
Figure 4:
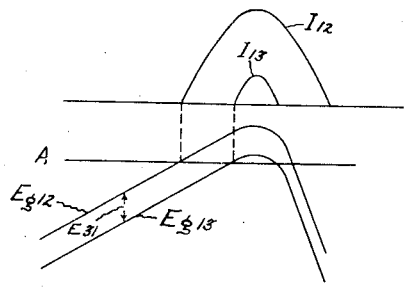

For a better understanding of my invention, together with other and further objects thereof, reference may be had to the following description taken in connection with the accompanying drawing, and its scope will be pointed out in the appended claims. In the drawing, Fig. 1 illustrates a converting system of the simplest form embodying my invention for transferring energy between a constant current direct current circuit and a constant potential alternating current circuit; Fig. 2 illustrates how my invention may be applied to a converting system transferring energy between a direct current circuit and a polyphase alternating current circuit; and Figs. 3 and 4 are graphical representations illustrating certain operating characteristics of my invention.

Referring now more particularly to Fig. 1 of the drawing, there is illustrated an arrangement embodying my invention for transferring energy between a constant current direct current circuit 10 and a constant potential alternating current circuit 11 which is represented in the drawing as a load. A pair of oscillatory circuits each including one of the electric valves 12 and 13 is arranged to receive energy from the direct current circuit 10. The oscillatory circuit for the electric valve 12 includes an inductor 14 and the capacitors 15 and 16. The oscillatory circuit for the electric valve 13 includes the capacitors 16, 17 and the inductor 18. The capacitors and inductors of these circuits are so chosen as to resonate at a frequency which is relatively high compared to the frequency of the alternating current circuit 11. For example, these circuits may be so designed as to have a normal oscillation frequency of 1000 cycles per second. A low frequency circuit comprising an inductor 19 is arranged to interconnect the oscillatory circuit with the alternating current circuit 11. In order to provide a high frequency by-pass for this low frequency inductor 19 the capacitor 20 may be connected across the inductor. It will be apparent that in designing the oscillatory circuit it may be possible to effectively incorporate the purpose of the capacitor 20 in the capacitors 15 and 17.

If, for example, as has been assumed, the oscillatory circuit of the electric valves 12 and 13 may be arranged so as to have a normal oscillation frequency of 1000 cycles per second, it is preferable to provide a control circuit for these valves which will cause these valves to become conductive at a lower frequency thereby providing sufficient time intervals to permit complete deionization of the valve. The charging of the capacitor 16 from the direct current line 10 through the capacitors 15 and 17 will cause certain voltage components to appear across the line 10. These voltage components are of a relatively high frequency which frequency is lower than the normal oscillation frequency of the oscillatory circuit of the valves 12 and 13. For example, it may be assumed that these voltage components have a frequency of 600 cycles per second. A voltage divider 38 and a source of bias voltage 21 are connected across the direct current circuit 10. An adjustable tap 22 connected to the voltage divider 38 permits the proper amount of these voltage components to be introduced into the grid or control circuit of the electric valves 12 and 13. A capacitor 23 is connected between the adjustable contact 22 and the cathodes of the electric valves so that the voltage component will have the desired wave shape. As is customary in the art, each of the grid circuits of the electric valves 12 and 13 may be provided with a current limiting resistor such as the resistors 24 and 25. Each of the grid circuits of the electric valves 12 and 13 also receives a voltage component derived from a suitable source of alternating current 26 which has a frequency corresponding to the frequency desired in the alternating current circuit 11, such as 60 cycles per second. The alternating current source 26 is connected to a magnitude controlling circuit including the voltage divider 27, a saturable reactor 28 and the transformer 29, the secondary winding of which is included in the grid circuits of the electric valves 12 and 13. A plurality of unilaterally conductive devices such as contact rectifiers 30 and 31 are arranged to be conductive in a direction toward a common junction point. An alternating potential is impressed across each pair of such unilaterally conductive devices so that the negative half wave of voltage supplied by the source will be effective between the control electrode or grid of one of the valves and its respective cathode. Thus in the arrangement shown a transformer 29 is connected across the contact rectifiers 30 and 31 so as to supply potential thereto and the outer extremities of such contact rectifiers are each connected to a different one of the control electrodes or grids. If it is assumed that the left-hand terminal of the secondary winding of the transformer 29 is positive, the rectifier 30 effectively connects the adjustable contact 22 directly to the grid resistor 24 with the result that the grid of electric valve 12 receives only a 600 cycle voltage component. At the same time, however, the contact rectifier 31 is arranged in such direction so that between the cathode and grid of the electric valve 13 there appears in addition to the 600 cycle voltage component a negative half wave of the 60 cycle voltage supplied from the alternating current circuit 26. Thus at the time when the electric valve 12 becomes conductive, the electric valve 13 remains nonconductive due to this negative voltage component of the 60 cycle alternating potential supplied to the grid circuit by the action of the contact rectifiers 30 and 31.

By varying the reactance of the reactor 28 by changing the saturation thereof in response to an electrical condition of the alternating current circuit 11, the voltage of the alternating current circuit 11 may be maintained within predetermined limits. The reactor 28 forms a shunt circuit across the primary winding of the transformer 29 and a variation of the reactance of the reactor 28 by the change in saturation will cause a change in the magnitude of the voltage appearing across the primary winding of the transformer 29 with the result that the amount or magnitude of the 60 cycle voltage component supplied to the grid circuits of the electric valves 12 and 13 is varied. This circuit for controlling the saturation of the saturable reactor 28 comprises a transformer 32 arranged so that its primary winding is connected across the load circuit 11. The secondary winding of this transformer 32 is connected to a bridge rectifier 33, the output of which is balanced against a direct current voltage supplied from the direct current source 34. The difference in voltage between the voltage of the direct current source 34 and the voltage supplied by the rectifying bridge 33 determines the current flow through the saturable reactor 28. A filter capacitor 35 is preferably connected across the output circuit of the bridge rectifier 33 and a suitable discharge resistor 36 is connected across the filter capacitor. The connections between the bridge rectifier 33 and the direct current source 34 also include a unilaterally conductive device 37 so arranged as to prevent the reversal of current through this circuit during the time that the electric valve inverting system is first placed into operation.

For purposes of explanation it will be assumed that the direct current potential has just been supplied to the conductors 10 and that the current divides through the reactor 19 and flows through each of the capacitors 15 and 17 through the capacitor 16 to the other side of the direct current circuit 10. This flow of current continues until the capacitor 16 has been charged to a predetermined value. The capacitor thus charges at a linear rate to a predetermined voltage and when this voltage has been reached the electric valves 12 and 13 are both rendered conductive so that the capacitor now discharges through the oscillatory circuits of the electric valves 12 and 13. It will be assumed that this discharge takes place at an oscillatory frequency of about 600 cycles per second. This 600 cycle component appears across the direct terminals 10 which is introduced into the grid circuits of the valves 12 and 13 by means of the voltage divider 38. If both the valves 12 and 13 are rendered conductive at the same instant there will be no voltage appearing across the low frequency inductor 19 and hence no voltage is supplied to the load circuit 11. If now it will be assumed that it is possible to permit electric valve 12 to be conductive and to delay the electric valve 13 by a small fraction of a second, for example $\frac{1}{10000}$ of a second, there will be a resultant voltage component appearing across the inductor 19. In the arrangement shown the retardation of the moments of ignition of the electric valve 13 varies sinusoidally from a value of zero to a maximum value of about $\frac{1}{10000}$ of a second during a $\frac{1}{120}$ of a second which is then followed by a period of $\frac{1}{120}$ of a second in which no retardation occurs. During the time that the moment of ignition of the electric valve 13 is not being retarded, the moment of ignition of the electric valve 12 is being retarded sinusoidally from a value of zero to a maximum of about $\frac{1}{10000}$ of a second. This retardation of the moment of ignition of the electric valves 13 and 12 is obtained by means of the negative half wave component of a 60 cycle alternating current appearing across the rectifiers 31 and 30, respectively. The 60 cycle alternating current component is supplied to the rectifiers 31 and 30 through the magnitude controlling circuit comprising the resistor 27 and the saturable reactor 28 from the source of alternating current 26. The potential supplied to the grid circuit of each one of the valves therefore comprises for $\frac{1}{120}$ of a second a 600 cycle alternating potential, and for the succeeding $\frac{1}{120}$ of a second a 600 cycle alternating component and the negative half cycle of the 60 cycle alternating component. In order that the 60 cycle component will combine properly with the 600 cycle component this latter wave must have a rounded wave shape so that the critical voltage of the respective valves will be reached at the proper time. This shape is obtained by the use of a capacitor 23. While for the purposes of explanation it has been assumed that the oscillatory circuits are designed to possess a natural frequency of oscillation of 1000 cycles per second and that the actual operation of the valves occurs at a rate of 600 cycles per second, it is to be understood that any other frequencies may be selected, which frequencies are higher than the frequency appearing across the alternating current circuit 11.

The upper curve shown in Fig. 3 illustrates the charging and discharging current $I_c$ of the capacitor 16 and the lower curve shows the voltage $E_c$ appearing across this capacitor. It will be apparent to those skilled in the art that the 600 cycle component for the grid circuit derived from across the terminals of the direct circuit 10 by means of the voltage divider 38 is similar to the voltage curve $E_c$ shown in Fig. 3. In Fig. 4 the line A represents the critical voltage which must be exceeded by the voltage appearing across the grid to cathode circuit before the electric valve will be rendered conductive. The voltage curve $E_{g12}$ illustrates the 600 cycle component being supplied to the electric valve 12 so that it conducts current shown by the curve $I_{12}$ for a longer period than the other valve 13. The voltage $E_{g12}$ supplied to the electric valve 12 has not been affected by the 60 cycle component due to the action of the contact rectifier 30. The 600 cycle component $E_{g13}$ supplied to the electric valve 13 however has been displaced in amplitude due to the bias supplied by the 60 cycle negative half-wave component appearing across the contact rectifier 31 and which is shown in Fig. 4 as $E_{31}$. The voltage wave $E_{g13}$ therefore crosses the critical voltage line A at a time subsequent to the crossing of the voltage wave $E_{g12}$ with the result that the valve 13 does not conduct current for as long a period as the electric valve 12 as is apparent from the current wave $I_{13}$. Thus the moment of ignition of electric valve 13 has been retarded with respect to the moment of ignition of electric valve 12. Obviously, of course, during the next half cycle of alternating current from the source 26 electric valve 13 will be rendered conductive first, and thereafter the electric valve 12 will become conductive. This retardation of the electric valves 12 and 13 occurs periodically and alternately so as to produce voltage components across the reactor 19 so as to produce an alternating current potential in the circuit 11 corresponding in magnitude, frequency, phase, and wave shape to 60 cycle potential supplied to the transformer 29 by the alternating current source 26. The adjustable contact 22 on the voltage divider 38 permits proper selection of the 600 cycle component to be derived from the direct current circuit during the starting operation. The adjustable contact on the resistor 27 controls the magnitude of the 60 cycle alternating current component supplied to the grid circuits thereby permitting the regulation of the output of the electric valve converting system. In response to predetermined electrical conditions of the alternating current circuit 11, as for example the voltage thereof, by means of the regulating circuit comprising the transformer 32, bridge rectifier 33, contact rectifier 37, direct current source 34 and the primary winding of the saturable reactor 28, the magnitude of the 60 cycle alternating current component supplied to the grid is so changed as to maintain the output of the electric valve converters appearing across the alternating current circuit 11 at a substantially constant value. If for example the alternating current voltage of the circuit 11 exceeds a predetermined value, the direct current voltage appearing across the resistor 36 which voltage is proportional to the alternating current voltage across the circuit 11, will exceed the constant potential of the source 34 so that direct current will flow through the rectifier 34 and the primary winding of the saturable reactor 28. This current causes a saturation of the reactor 28 with the resultant lowering of the alternating current reactance so that it operates as a low impedance shunt across the input winding of the transformer 29 thereby reducing the magnitude of the 60 cycle potential appearing across the secondary winding of the transformer 29, and thus the output of the electric valve converting system is so reduced as to keep the voltage across the circuit 11 from exceeding a predetermined value.

While for the purposes of illustrating my invention I have shown in the drawing a pair of electric valves 12 and 13 as being of the type comprising a cathode, an anode and a control grid enclosed in an envelop containing an ionizable medium, it will be of course, understood by those skilled in the art that any other suitable electric valve containing an anode, a cathode and a control or starting electrode may be utilized. Furthermore, it will be apparent that other circuit arrangements may be utilized for controlling the 60 cycle alternating current component supplied to the grid circuits of the electric valves in response to the voltage across the alternating current circuit 11.

Referring to Fig. 2 I have illustrated therein a modification of my invention in which an electric valve converting system operates to transfer energy between the constant current direct current circuit 40 and the constant potential alternating current circuit 41. A plurality of oscillatory circuits each including one of the electric valves 42, 43, 44, are arranged to be energized from a direct current source 40. The oscillatory circuit of the electric valve 42 comprises the inductor 45, the capacitor 46 and the capacitor 47. The oscillatory circuit of the electric valve 43 includes the capacitor 47, capacitor 48 and the inductor 49. Likewise the oscillatory circuit of the electric valve 44 includes the capacitor 47, the capacitor 50 and the inductor 51. The low frequency circuit interconnecting these oscillatory circuits with the alternating current circuit 41 comprises a transformer having a primary winding 52 connected to these oscillatory circuits and a secondary winding 53 connected to the alternating current circuit 41. The three terminals of the star connected primary winding 52 are supplied with capacitors 54, 55 and 56 which are arranged to by-pass the high frequency components of the oscillatory circuits of the electric discharge valves 42, 43 and 44. By successively and periodically retarding the moments of ignition of the electric valves 42, 43, 44, in accordance with the principles set forth in connection with the description of the operation of Fig. 1 of my invention, it will be apparent that relatively low frequency alternating current components will be produced across the primary winding 52 of the transformer, the secondary 53 of which is connected to the alternating current circuit.

As is apparent to those skilled in the art the control circuit for the valves 42, 43 and 44 is similar to that disclosed in Fig. 1, and therefore it is not believed necessary to disclose such a circuit in its entirety. The feature of the arrangement utilizing the unilaterally conductive devices, however, is shown and a plurality of such devices 57, 58 and 59 are arranged so as to be conductive toward a common junction point. A voltage is applied across the outer terminals of each pair of these devices by means of one of the inductive windings of the delta-connected secondary winding 60 of a transformer, the primary winding 61 of which is connected to a suitable source of alternating potential. The common junction point is connected to the adjustable contact 22 of a resistor such as resistor 38 shown in Fig. 1. This arrangement of unilaterally conductive devices operates to supply negative half wave components to two of the valves while permitting the third valve to become conductive.

Although the arrangements shown and described are particularly suited for the transfer of energy between a constant current direct current circuit and a constant potential alternating current circuit, it of course will be apparent to those skilled in the art that in certain instances the electric valve converting system shown may be utilized to transfer energy between direct and alternating current circuits both of which have constant potential characteristics.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination with an electric valve converting system for transferring energy between direct and alternating current circuits including a plurality of electric valves, a control circuit for said valves including a source of high frequency periodic potential arranged to tend to simultaneously ignite said valves and means including a source of low frequency periodic potential for alternately retarding the moments of ignition of said valves.

2. The combination with an electric valve converting system for transferring energy between direct and alternating current circuits including a plurality of electric valves, a control circuit for said valves including a source of relatively high frequency periodic potential tending to simultaneously ignite said valves, means including a source of low frequency periodic potential for alternately retarding the moments of ignition of said valves, and means responsive to an electrical condition of the output circuit of said electric valve converting system for controlling the degree of retardation of said moments of ignition.

3. An electric valve converting system for transferring energy between a constant current direct current circuit and a constant potential alternating current circuit comprising a plurality of high frequency oscillatory circuits arranged in parallel across said direct current circuit, each of said latter circuits including a controlled electric valve, means interconnecting said alternating current circuit with said oscillatory circuit, and a control circuit for said electric valves for periodically and alternately shifting the phase of the oscillations of said oscilatory circuit at a frequency corresponding to the frequency of said alternating current circuit.

4. An electric valve converting system for transferring energy between a constant current direct current circuit and a constant potential alternating current circuit comprising an energy storage device arranged to be charged from said direct current circuit, a plurality of high frequency oscillatory circuits arranged in parallel to said energy storage device, each of said latter circuits including a controlled electric valve, a low frequency circuit interconnecting said latter circuits with said alternating current circuit, and means for periodically and alternately retarding the moment of ignition of said valves whereby low frequency power components are induced in said low frequency circuit.

5. An electric valve converting system for transferring energy between a constant current direct current circuit and a constant potential alternating current circuit comprising a plurality of high frequency oscillatory circuits arranged in parallel across said direct current circuit, each of said oscillatory circuits including a controlled electric valve, means interconnecting said oscillatory circuits with said alternating current circuit, and a control circuit for said electric valves for periodically and alternately retarding the moments of ignition of said valves at a low frequency corresponding to the frequency of said alternating current circuit whereby said oscillatory circuits will be caused to produce power components in said alternating current circuit.

6. An electric valve converting system for transferring energy between a constant current direct current circuit and a constant potential alternating current circuit comprising an energy storage device connected across said direct current circuit, a plurality of high frequency oscillatory circuits arranged for discharging said energy storage device, each of said latter circuits including a controlled electric valve, a low frequency circuit interconnecting said latter circuit with said alternating current circuit, means for periodically and alternately retarding the moment of ignition of said valve to induce low frequency power components in said low frequency circuit, and means responsive to an electrical condition of said alternating current circuit for controlling the degree of retardation of said moment of ignition.

7. An electric valve converting system for transferring energy between a constant current direct current circuit and a constant potential alternating current circuit comprising a plurality of high frequency oscillatory circuits arranged in parallel across said direct current circuit, each of said oscillatory circuits including a controlled electric valve, a control circuit for said electric valves including a source of high frequency periodic potential and a low frequency periodic potential for alternately retarding the moments of ignition of said valves, a low frequency circuit interconnecting said alternating current circuit with said oscillatory circuit and being responsive to power components resulting from said low frequency periodic and alternate retardation of the moments of ignition of the valves in said high frequency oscillatory circuits, and means responsive to an electrical condition of said alternating current circuit for controlling the degree of retardation of said moments of ignition thereby to maintain the potential of said alternating current circuit at a constant value.

8. An electric valve converting system for transferring energy between a constant current direct current circuit and a constant potential alternating current circuit comprising an energy storage device connected across said direct current circuit, a pair of high frequency oscillatory circuits arranged in parallel to said energy storage device, each of said latter circuits including a controlled electric valve, a low frequency circuit interconnecting said latter circuits with said alternating current circuit, a control circuit for said electric valves including a source of high frequency periodic potential and a low frequency periodic potential, means whereby said low frequency periodic potential alternately retards the moments of ignition of said valves, and means responsive to an electrical condition of said alternating current circuit for controlling the magnitude of said low frequency periodic potential thereby to control the degree of periodic and alternate retardation of the moments of ignition of said valves.

9. The combination with a pair of controlled electric valves each provided with a cathode and a control electrode comprising a pair of oppositely arranged unilaterally conductive devices arranged to be conductive in a direction toward a common junction point, a source of alternating potential connected across the outer terminals of said devices, means connecting each of said control electrodes to the outer terminal of a different one of said devices, and a second source of control potential connected between said cathodes and the common junction between said unilaterally conductive devices.

10. The combination with a pair of controlled electric valves each provided with a cathode and a control electrode comprising a pair of oppositely arranged unilaterally conductive devices connected in series between said control electrodes, a source of alternating potential connected across said devices, and a source of negative potential connected between the cathodes of said valves and the common junction between said unilaterally conductive devices.

11. The combination with a plurality of controlled electric valves each provided with a cathode and a control electrode comprising a plurality of unilaterally conductive devices connected to be conductive toward a common junction point, means for supplying an alternating potential across the outer extremities of each pair of said devices, means for connecting each outer extremity of said unilaterally conductive devices to a different one of said control electrodes, and a source of biasing potential connected between the cathodes of said valves and the common junction between said unilaterally conductive devices.

12. The combination with a plurality of controlled electric valves each provided with a cathode and a control electrode comprising a plurality of unilaterally conductive devices arranged to be conductive toward a common junction point, means connecting each of said outer terminals of said devices to a different one of said control electrodes, means for applying alternating potential across the outer terminals of each pair of said conductive devices, a source of negative potential and a source of alternating potential both connected in series between said cathodes and the common junction between said unilaterally conductive devices.

WILLEM F. WESTENDORP.